United States Patent [19]

Raymond et al.

[11] Patent Number: 5,594,895
[45] Date of Patent: Jan. 14, 1997

[54] METHOD AND APPARATUS FOR SWITCHING BETWEEN CLOCK GENERATORS ONLY WHEN ACTIVITY ON A BUS CAN BE STOPPED

[75] Inventors: Jon H. Raymond, Underhill; Sebastian T. Ventrone, Jericho, both of Vt.

[73] Assignee: International Business Machines Corporation, Armonk, N.Y.

[21] Appl. No.: 430,120

[22] Filed: Apr. 27, 1995

Related U.S. Application Data

[63] Continuation of Ser. No. 991,045, Dec. 15, 1992, abandoned.

[51] Int. Cl.⁶ ........................................ G06F 1/08
[52] U.S. Cl. .............. 395/556; 395/184.01; 364/DIG. 1; 364/270.2
[58] Field of Search ............................ 371/1; 377/47–48, 377/52, 118; 395/184.01, 550

[56] References Cited

U.S. PATENT DOCUMENTS

| | | | |
|---|---|---|---|
| 4,344,036 | 8/1982 | Dakroub | 328/61 |
| 4,419,629 | 12/1983 | O'Brien | 328/72 |
| 4,490,581 | 12/1984 | Edwards et al. | 379/279 |
| 4,560,939 | 12/1985 | DeKarske | 328/72 |
| 4,644,498 | 2/1987 | Bedard et al. | 395/575 |
| 4,722,070 | 1/1988 | Dye | 395/550 |
| 4,748,417 | 5/1988 | Spengler | 379/99 |
| 4,821,229 | 4/1989 | Jauregui | 395/550 |
| 4,823,262 | 4/1989 | Calle | 395/550 |
| 4,853,653 | 8/1989 | Maher | 331/49 |
| 4,870,299 | 9/1989 | Chen | 307/269 |
| 4,882,738 | 11/1989 | Suzuki | 375/357 |
| 4,893,271 | 1/1990 | Davis et al. | 395/550 |
| 4,899,351 | 2/1990 | Bonke | 375/108 |
| 4,965,524 | 10/1990 | Patchen | 328/72 |
| 4,970,405 | 11/1990 | Hagiwara | 327/145 |
| 4,975,931 | 12/1990 | Cosand | 377/52 |
| 5,047,924 | 9/1991 | Fujioka et al. | 395/550 |
| 5,047,967 | 9/1991 | Sander et al. | 364/569 |
| 5,065,415 | 11/1991 | Yamashita | 377/52 |
| 5,086,387 | 2/1992 | Arromo et al. | 395/550 |
| 5,099,141 | 3/1992 | Utsunumiya | 327/99 |
| 5,109,521 | 4/1992 | Culley | 395/800 |
| 5,122,677 | 6/1992 | Sato | 327/99 |
| 5,133,064 | 7/1992 | Hotia et al. | 395/550 |
| 5,142,247 | 8/1992 | Lada | 331/14 |
| 5,155,380 | 10/1992 | Hwang et al. | 307/269 |
| 5,155,840 | 10/1992 | Niijima | 395/550 |
| 5,195,111 | 3/1993 | Adachi et al. | 377/52 |
| 5,249,214 | 9/1993 | Ulmer et al. | 377/121 |
| 5,261,082 | 11/1993 | Ito et al. | 395/550 |
| 5,274,796 | 12/1993 | Conner | 395/550 |
| 5,291,528 | 3/1994 | Vermeer | 375/106 |
| 5,301,306 | 4/1994 | Plog | 395/550 |
| 5,319,771 | 6/1994 | Takeda | 355/550 |
| 5,467,466 | 11/1995 | Carlson | 395/550 |

FOREIGN PATENT DOCUMENTS

| | | |
|---|---|---|
| 0359233 | 9/1989 | European Pat. Off. . |
| 89116956 | 4/1991 | European Pat. Off. . |
| 3048188 | 4/1991 | Japan . |

OTHER PUBLICATIONS

Intel, "Intel 82347 Power Management PC Peripheral" May 1990, (Preliminary) pp. 1–30.

*Primary Examiner*—Lance L. Barry
*Attorney, Agent, or Firm*—James M. Leas; J. Dennis Moore

[57] ABSTRACT

Method and apparatus for providing a microprocessor with a divide by one frequency generator, while permitting the external clock driving the generator to vary in frequency without interruption of the operations of the microprocessor. A divide by two clock generator is also provided on the microprocessor chip. When a change in the frequency of the external clock is desired a request signal is provided to the chip. After a period of time has elapsed that permits the microprocessor to achieve a "safe" mode in which processing integrity is maintained even if the clock signal is interrupted, the divide by two clock generator is switched into operation. The external clock is then allowed to change frequency after which the divide by one clock generator is reactivated, following a period of time sufficient to allow the divide by one clock generator to stabilize.

11 Claims, 4 Drawing Sheets

METHOD AND APPARATUS FOR SWITCHING BETWEEN CLOCK GENERATORS ONLY WHEN ACTIVITY ON A BUS CAN BE STOPPED

This is a continuation of application Ser. No. 07/991,045 filed on Dec. 15, 1992, now abandoned.

BACKGROUND OF THE INVENTION

1. Field of the Invention

The present invention relates to microprocessors having on-chip clock generators that are driven by external clock signals, and more particularly relates to such microprocessors in which the on board clock generator is a divide by one clock generator.

2. Background Art

Microprocessors are typically driven by quartz crystal oscillator clock signal sources that are external to the microprocessor chip itself. The reason for this is that quartz crystal oscillators are very stable in frequency, which is desirable in microprocessor operation. However, while very stable in frequency, it is well known that the duty cycle of quartz crystal oscillators varies considerably from crystal to crystal. As a consequence, the practice that has developed in the art is to provide a quartz crystal oscillator having a frequency that is twice that needed to drive the microprocessor itself, and then provide a divide by two clock generator on the microprocessor chip itself. The divide by two clock generator uses only the leading edge of the quartz crystal clock signal, which is, as described above, very stable, to trigger the rising and falling transitions, thereby providing an on board clock signal that is very stable both with respect to frequency and as to duty cycle.

However, recently microprocessor technology has advanced to the point where the frequency at which microprocessors can be operated has become so great that it is impractical to utilize the traditional divide by two on board clock generator, because the external clock frequency would simply be too high to permit the provision of practical circuitry therefore. Accordingly, sophisticated divide by one clock generators, incorporating phase lock loops or delay line clock generators, have been provided. These new clock macros have the advantage of operating the internal logic at divide by one speed versus the traditional divide by two mode. However these clock generators require the input clock frequency to remain constant in order to generate stable internal clocks.

Another trend in computer technology has been the incorporation of such high performance microprocessors in battery operated personal computers, such as so called lap top and notebook computers. In such computers, the battery life has become a critical design issue. This, in turn, has stimulated focus on power savings in such battery operated personal computers. A well known technique to save power in personal computers is to reduce the clock speed of the microprocessor wherever possible. However, in those instances where the microprocessor is one of the aforementioned high performance microprocessors having a divide by one on board clock generator, shifting the external clock frequency "on the fly", i.e., dynamically, is, as mentioned above, not possible. Changing the input frequency to phase lock loop and delay line clock generators causes the internal clocks to be corrupted, most likely resulting in a code error.

Accordingly, there is a need for a microprocessor having a divide by one on board clock generator that has the ability to accept an external clock which can change frequency during operation, so as to permit such microprocessor to be utilized in low power consumption applications.

This need is met in the present invention.

SUMMARY OF THE INVENTION

According to the present invention a microprocessor is provided receiving a stream of data and instructions and, in response to said instructions, operating on the data, the microprocessor including a divide by one frequency generator that receives an external clock signal and in response thereto generates an internal clock signal having the same frequency as the external clock signal but having modified characteristics, as compared to the external clock signal, and being capable of having the frequency of the external clock signal applied thereto changed without effecting the integrity of the operations of the microprocessor. The invention includes a non-one divider type clock generator that receives the external clock signal and in response thereto generates an internal clock signal having a fractional frequency of the external clock signal.

An arrangement is provided for receiving a request signal indicating a request for a change in the external clock signal frequency, and in response thereto monitoring the microprocessor to determine when a mode of operation of the microprocessor has occurred in which the instruction stream can be stopped. In response to the determination that such mode has occurred, operation is switched from the divide by one clock generator to the non-one divider type generator. A ready signal is then generated indicating that the change in the external clock signal frequency can be made.

According to one aspect of the present invention, when a completion signal is received, indicating the external clock signal frequency change has been made, operation is switched from the non-one divider type generator to the divide by one generator, after a period of time has occurred that is sufficient to allow the divide by one clock generator to stabilize.

Thus the present invention provides a dynamic frequency protocol that allows a microprocessor to contain a divide by one generator, and still have the ability to respond to a dynamic frequency shift without impacting the software stream. The result is that systems can still attain the power savings of frequency shifting, and still have the higher system performance of divide by one clocking as needed.

These and other objects and advantages of the present invention will be more apparent from the following more particular description of the preferred embodiments of the invention, as illustrated in the accompanying drawings.

DETAILED DESCRIPTION OF THE PREFERRED EMBODIMENTS

Figure 1:
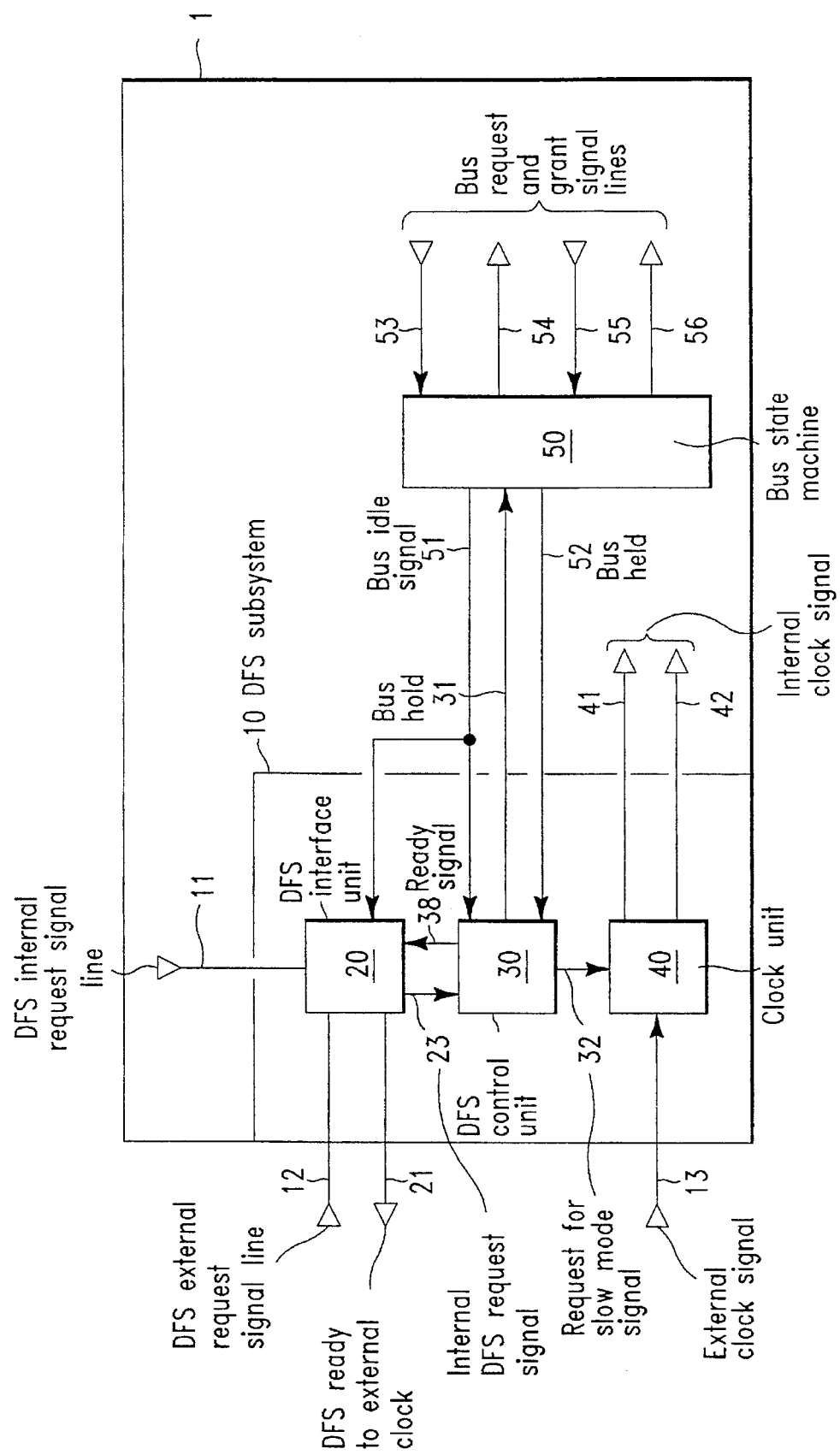
FIG. 1 is a block diagram of a microprocessor modified in accordance with a preferred embodiment of the present invention.

FIG. 1 shows a microprocessor 1 according to a preferred embodiment of the present invention. A novel dynamic frequency shift ("DFS") subsystem 10 is shown, as well as a conventional bus state machine 50. Other aspects of microprocessor 1 are well known in the art. To avoid obscuring the invention, detailed description of these other aspects of microprocessor 1 will be omitted, except as necessary for an understanding of how the preferred embodiment 10 interfaces with and interacts with such other elements.

The DFS Subsystem 10 includes three units, a DFS Interface Unit 20, a DFS Control Unit 30, and a Clock Unit 40. An external clock signal, CLK, is received at the input 13 of the Clock Unit 40, which generates internal clock signals of two different phases which are output on lines 41 and 42. Clock Unit 40 includes a divide by two clock generator and a divide by one clock generator, as is discussed in detail below. It will be understood that, in general, the number of clock output signals and their relative phase are dependent upon the particular requirements of the microprocessor with which the clock unit is associated. These considerations are well known in the art and are not discussed further herein. The DFS Subsystem 10 receives a request that an external clock frequency shift be allowed by way of an internal request signal on line 11, DFS_REQI, and also, alternatively, by way of an external signal on line 12, DFS_REQE, which are applied as inputs to the DFS Interface Unit 20. DSF_REQE is provided by the external system (not shown) in which the microprocessor operates. DFS_REQI is provided by an internal control register (not shown) that the system software can set.

The DFS Subsystem 10 Interfaces with the bus state machine 50 of the microprocessor 1. The operation of the bus state machine 50 is microprocessor dependent, and the principals that are applied thereto are well known in the art. In general, the bus state machine 50 monitors internal and external requests for utilization of the microprocessor bus (not shown) and grants access depending upon whether the bus is idle. An external bus request signal is received on line 53, an external bus grant signal is provided on line 54, an internal bus request signal is received on line 55 and the internal bus grant is provided on line 56. A signal called BUS_IDLE, which is active, i.e., 1, when the microprocessor bus is idle, is provided on line 51. A signal called BUS_HOLD is provided on line 31, and is activated when it is desired that the microprocessor bus, when idle, be held, that is, blocked from granting access to the bus in response to either an internal or an external bus request. When the bus is successfully held, a signal called BUS_HELD is provided on line 52. The signals on lines 31, 51 and 52 are utilized in conjunction with the operation of the preferred embodiment, as is discussed in detail below.

When a DFS request signal is received by the DFS Interface Unit 20, either on line 11 or 12, and signal line 51 is active, indicating that the bus is idle, an internal DFS_REQ signal is passed to the DFS Control Unit 30 on line 23. This causes the BUS_HOLD signal to be applied to line 31 by which it is transmitted to the bus state machine 50. When the bus state machine determines that the bus has, in fact, been held, it activates line 52 with BUS_HELD, which is applied to the DFS Control Unit 30.

This causes a signal called SLOW_MODE to appear on line 32, which causes a request for a switch from the divide by one clock in clock unit 40 to the divide by two clock therein.

At the same time, a DFS_RDY signal is applied to line 38 and thence to line 21. The external clock, upon receiving the DFS_RDY signal, begins its dynamic frequency shift to a lower frequency. Since, as this is occurring, the divide by two clock is operational to provide the microprocessor internal clock signals, no disruption occurs in microprocessor operation.

Once the frequency shift is completed, the DFS request line 11 or 12 is deactivated, i.e., goes to 0. This is communicated to the DFS control unit 30 by way of line 23. Once a sufficient period of time has passed to allow the divide by one clock in clock unit 40 to stabilize, line 32 is deactivated, causing the clock unit 40 to switch to operation using the divide by one clock generator.

Figure 6:
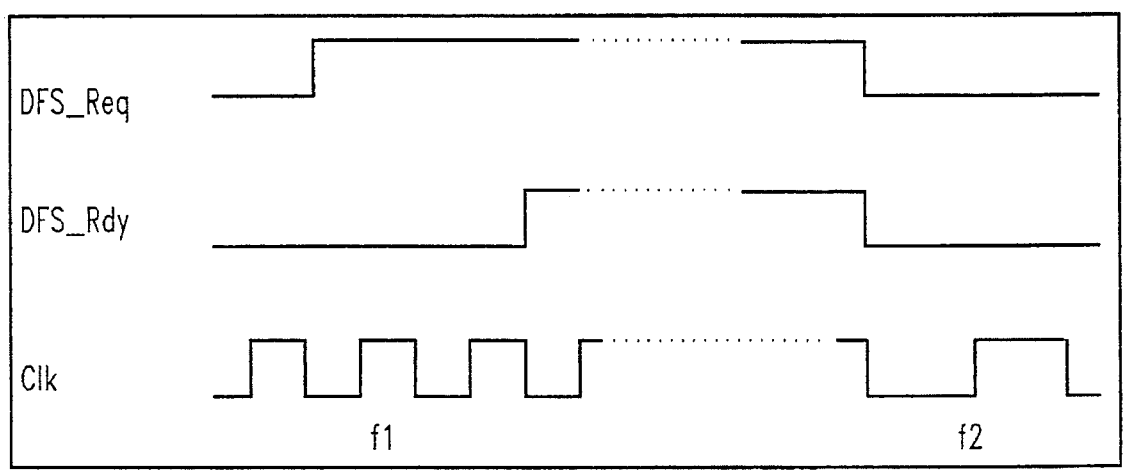
FIG. 6 is a diagram of certain signals that occur during operation of the embodiment shown in FIG. 1.

The foregoing general description of the operation of the preferred embodiment 10 of the present invention is intended to provide a general understanding of such operation. A detailed description of the operation is set forth hereinbelow. In this detailed discussion, reference will be made to FIG. 1, which shows the overall interconnection of the various units of the DFS Subsystem 10, FIG. 2 which shows the internal logical structure of the DFS Interface Unit 20, FIG. 3 which shows the internal logical structure of the DFS Control Unit 30, FIG. 4 which shows the internal logical structure of the Clock Unit 40, and FIG. 5 which is a flow diagram showing all of the steps in the sequence of operation of the preferred embodiment in changes from fast mode to slow mode and back again to fast mode. In addition, FIG. 6 shows the relationship between the DFS_REQ, DFS-RDY and CLK signals during a shift from a higher frequency, f1, to a lower frequency, f2.

Figure 2:
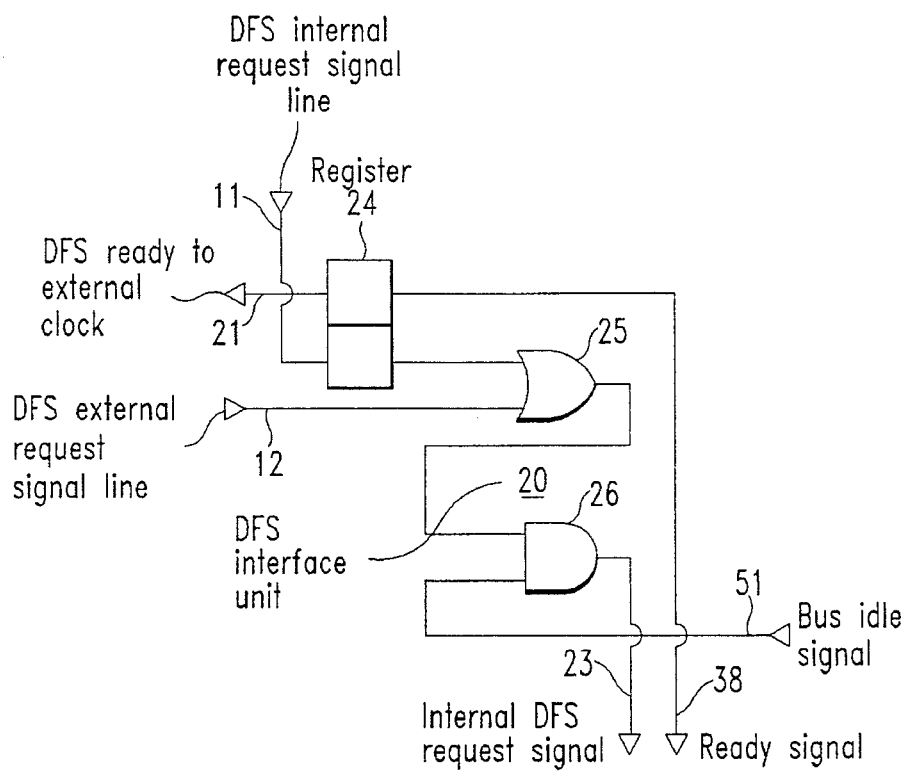
FIG. 2 is a logic diagram of the DFS Interface Unit 20 of FIG. 1.
Figure 3:
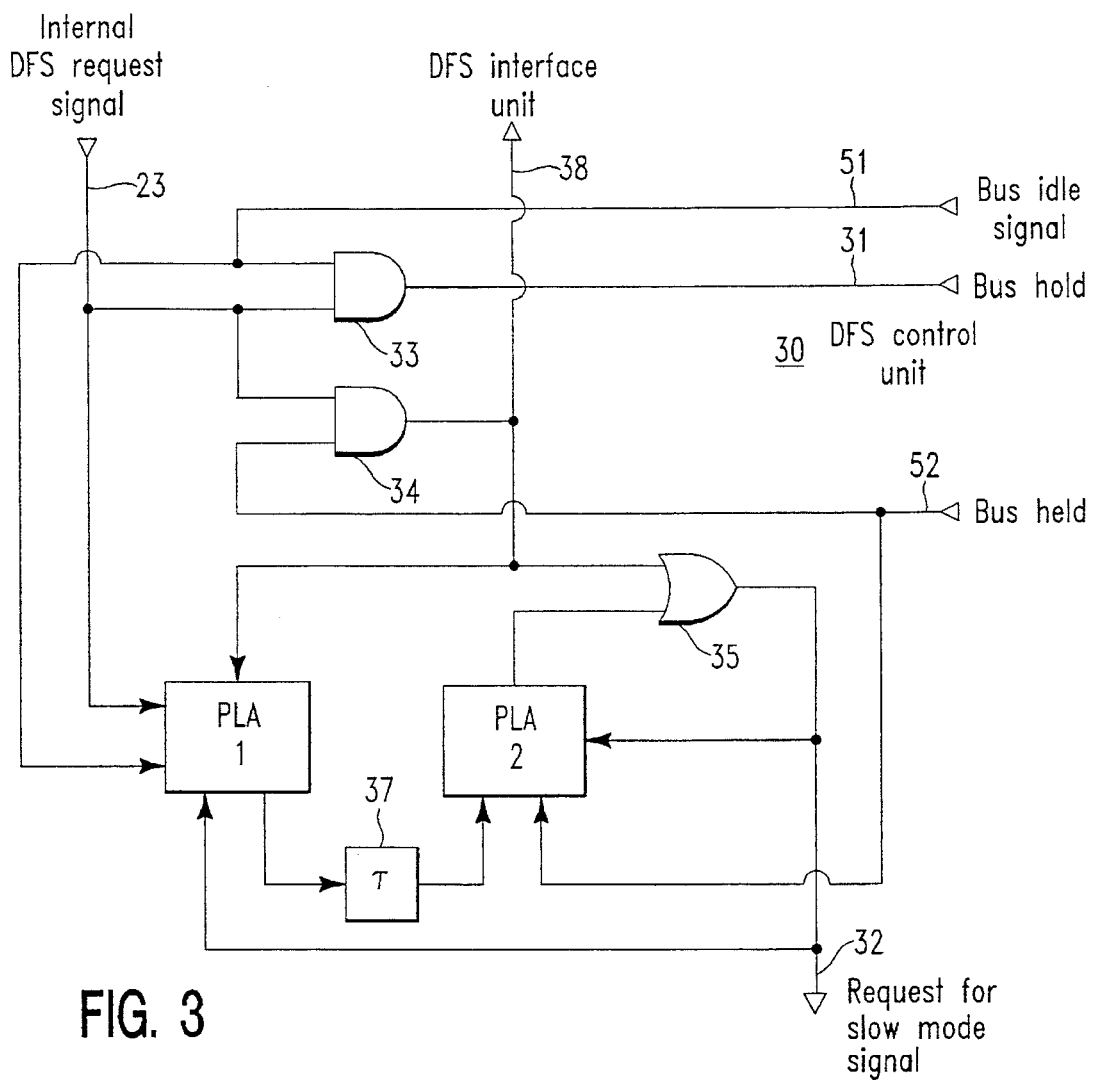
FIG. 3 is a logic diagram of the DFS Control Unit 30 of FIG. 1.
Figure 4:
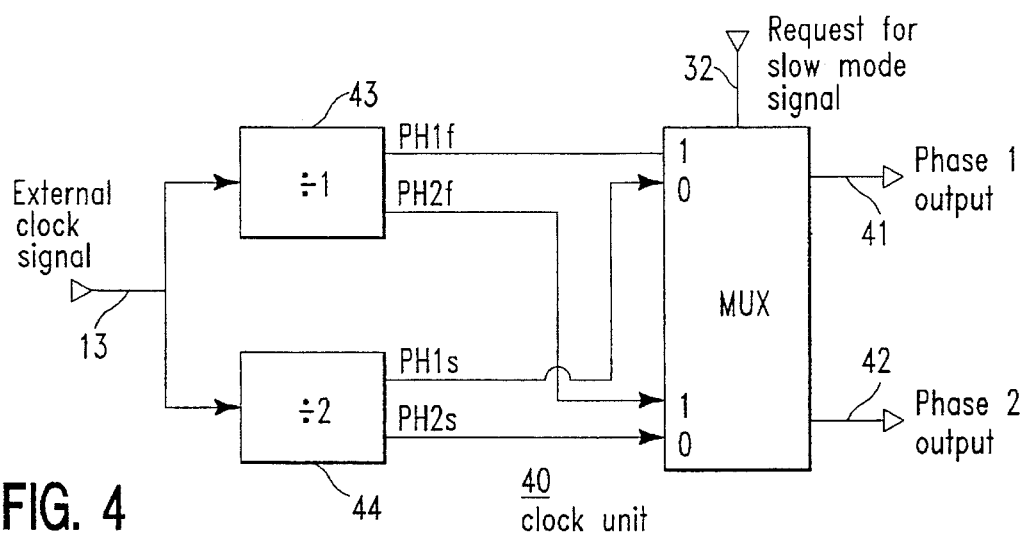
FIG. 4 is a block diagram of the Clock Unit 40 of FIG. 1.

In the following discussion, the primary reference figure will be FIG. 5, which sets forth the logical sequence of the steps. As these steps are described, reference will be made to FIG. 1, FIG. 2, FIG. 3 or FIG. 4, as the case may be to assist the reader in understanding which of the logical elements are involved in the particular step in FIG. 5. The logic elements shown in FIGS. 2, 3 and 4 are conventional, such as AND gates and OR gates. PLA 1 and PLA2, shown in FIG. 3, implement the functions shown in Table 1. Design of PLAs to a given function is a well known art, and therefore details of implementation are omitted herein.

TABLE 1

PLA 1:
    IF DFS_RDY goes to 0, AND IF BUS_IDLE = 1,
AND IF DFS_REQ = 0,
    THEN generate BUS_HOLD.
    IF SLOW_MODE = 0, THEN release BUS_HOLD.
PLA 2:
    IF τ goes to 0, AND IF SLOW_MODE = 1,
AND IF BUS_HELD = 1,
    THEN let output go to 0.
    IF τ goes to 1, THEN let output go to 1.

Figure 5:
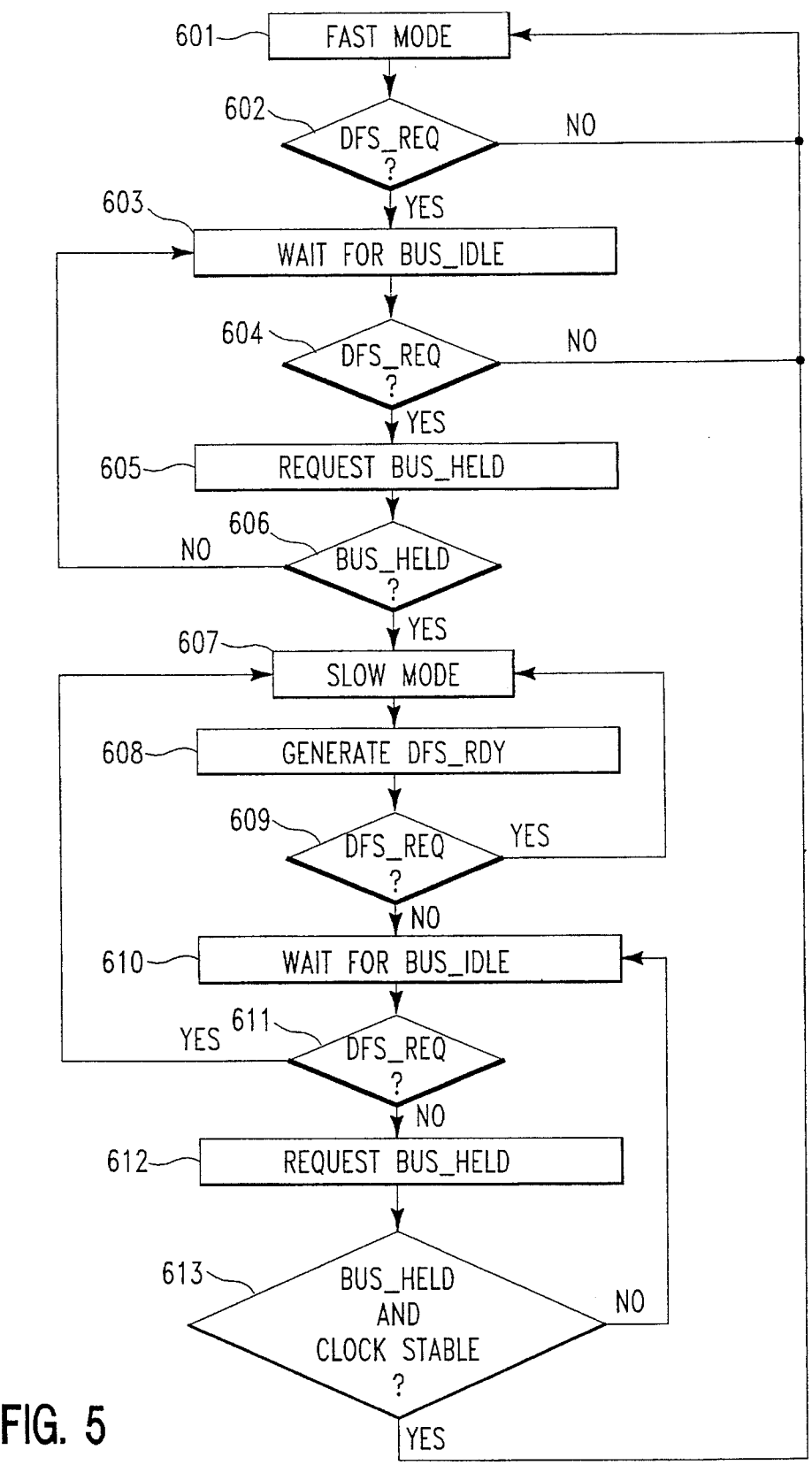
FIG. 5 is a flow diagram setting forth the sequence of steps implemented in the method of a preferred embodiment of the present invention.

Referring now to FIG. 5, it is assumed that the DFS Subsystem 10 (FIG. 1) begins in fast mode 601. In this state the external clock signal CLK is provided on line 13 at the higher external clock frequency, and the DFS request lines 11, 12 are deactivated (FIG. 2). Note that block 24 represents a register. Thus, if line 11 is activated, the data is stored in register 24, and communicated to line 22. If a DFS request line 11, 12 goes active 602 (FIG. 5) the system waits for the bus idle signal to go active 603. Referring to FIG. 2, it will be seen that OR gate 25 communicates the signals on lines 11 and 12 to a single input of AND gate 26, where that signal is ANDed with the BUS_IDLE signal line 51 to activate line 23, carrying DFS_REQ.

If the DFS request signal line (output of OR gate 25) is still active when the BUS_IDLE signal is detected on line 51, (step 604 in FIG. 5), then a request 605 is made for the BUS_HELD signal to be activated. This is accomplished by the activation of the BUS_HOLD signal line 31, as shown in FIG. 3. Once the BUS_HELD line 52 is activated, provided that signal line 23, carrying the DFS_REQ line, is still active, then AND gate 34 passes the slow mode request signal, SLOW_MODE, through OR gate 35 to signal line 32. The signal on line 32 is applied to the multiplexer 45 shown in FIG. 4 to effect the change from the divide by one clock 43 to the divide by two clock 44.

Note, in FIG. 5, that steps 602 and 604 show that if the DFS request signal drops out at either of those steps, the DFS shift is aborted, and the microprocessor continues in fast mode. Similarly, as shown by the negative path in step 606, if the BUS_HELD signal is not immediately forthcoming, both BUS_IDLE and DFS_REQ must continue active, or else the shift aborts and the system remains in fast mode, as shown by the negative path from step 604.

Note also, in FIG. 4, that divide by one clock generator 43 and divide by two clock generator 44 both output signals of different phases, indicated as as PH1 and PH2. Multiplexer 45 selects both of these output signals when a particular clock generator is selected. Phase 1 is output on line 41 and phase 2 is output on line 42.

Continuing now in FIG. 5 beginning with step 607, the subsystem is in slow mode. In slow mode, the DFS Subsystem 10 generates (step 608) the signal DFS-RDY which is provided on line 38 (FIG. 3) to register 24 (FIG. 2), where it is output on line 21.

Once DFS_RDY is generated, the system can change the frequency of CLK. Once this change is complete, the system remains in Slow mode until the DSF_REQ signal line 11 or 12 (FIG. 2) is deactivated 609. DFS_RDY goes to 0 at this point. PLA 1 then waits for the BUS_IDLE signal on line 51 (step 610) and if the DSF_REQ line remains inactive 611 a BUS_HOLD signal is generated 612. PLA 2 waits for the BUS_HELD signal line 52 to go inactive and waits for the clock to stabilize (τ propagation, 37) 613. The circuitry that permits stabilization of the clock is implemented in time delay circuit 37 in FIG. 3. When signal line 38, which is the output of AND gate 34, goes low, the output of element 37 remains high for a period of time τ, holding output line 32 active for that period of time, at the end of which signal line 32 is released. Since SLOW_MODE is 0, the output of PLA 2 goes to a 0, resulting in SLOW_MODE going to 0, i.e., fast mode is invoked.

Thus, it has been shown that in accordance with the invention a microprocessor may be provided with a divide by one clock generator, while still having the capability of responding to a dynamic frequency shift of the external clock generator. Many variations and the circuitry and sequence may be made by those skilled in the art, once the principals of the invention, as expressed herein, are understood. For example, the preferred embodiment set forth above operates in conjunction with a microprocessor in which the switch from SLOW_MODE to FAST_MODE and from FAST_MODE to SLOW_MODE occurs in a single cycle. Thus, the same signal that triggered the shift from SLOW_MODE to FAST_MODE, and vice versa, was provided as the DFS_RDY signal. In other microprocessors, if more than one cycle is required to effect such a switch an additional gate may be required to hold off the sending of the DSF_RDY signal, pending activation of a single signal line indicating completion of the shift.

In addition, while the embodiment disclosed herein is implemented in a combination of PLAs and combinatorial logic, in general the implementation in silicon is widely variable depending on the design system and designer preferences. For example, it is conceivable that the entire embodiment might be implemented in a single PLA, or entirely in combinatorial logic. The following claims are intended to encompass all such modifications.

What is claimed is:

1. A microprocessor capable of interacting with an external clock generator and an external bus, the microprocessor comprising:

a divide by one clock generator having means for receiving an external clock signal from the external clock generator and in response thereto generating a fast internal clock signal having the same frequency as the external clock signal, the microprocessor capable of operating from said fast internal clock signal;

a non-one divider type clock generator having means for receiving the external clock signal and in response thereto generating a slow internal clock signal having a fractional frequency of the external clock signal, the microprocessor capable of operating from said slow internal clock signal;

means for receiving a request signal indicating a request that the external clock signal frequency be allowed to change, and in response thereto monitoring said microprocessor to determine when a mode of operation of said microprocessor has occurred in which activity of the external bus can be stopped;

means, responsive to the determination that said mode has occurred, for stopping activity of the external bus, switching the microprocessor from operation from said divide by one clock generator to operation from said non-one divider type clock generator, and for then allowing activity of the external bus to begin again;

means for generating and providing a ready signal to the external clock generator responsive to operation from said non-one divider type clock generator indicating that the external clock signal frequency is allowed to change; and means for switching the microprocessor from operation from said non-one divider type clock generator to operation from said divide by one clock generator after providing said ready signal.

2. A microprocessor according to claim 1, further comprising:

means for receiving a completion signal indicating that the external clock has stabilized; and means for switching from operation of said non-one divider type generator to said divide by one generator after a period of time has occurred after said completion signal is detected sufficient to allow said divide by one clock generator to stabilize.

3. A microprocessor as recited in claim 1, wherein said means for switching the microprocessor from operation from said non-one divider type clock generator to operation from said divide by one clock generator is provided after the microprocessor receives a signal indicating that the external clock signal frequency has changed.

4. A method as recited in claim 3, said signal being inactivation of said request signal.

5. A microprocessor as recited in claim 1, wherein said means for switching the microprocessor from operation from said non-one divider type clock generator to operation from said divide by one clock generator is provided after a delay period.

6. A method for changing the frequency of an external clock signal from an external clock generator applied to a microprocessor circuit, said microprocessor receiving a stream of data and instructions, and in response to said instructions, operating on said dam, said microprocessor including a divide by one clock generator that receives said external clock signal and in response thereto generates an internal clock signal having the same frequency as said external clock signal but having modified characteristics, as compared to said external clock signal, and including a non-one divider type clock generator associated with said microprocessor that receives said external clock signal and in response thereto generates an internal clock signal having a fractional frequency of said external clock signal, said method comprising the stops of:

receiving a request signal indicating a request that the external clock signal frequency be allowed to change, and in response thereto monitoring said microprocessor to determining when a safe mode of operation of said microprocessor has occurred in which external bus activity can be stopped;

in response to the determination that said safe mode has occurred stopping said external bus activity, switching tho microprocessor from operation from said divide by one clock generator to operation from said non-one divider type generator, and then allowing said external bus activity to begin again; and generating and providing a ready signal to the external clock generator responsive to operation from said non-one divider type clock generator indicating that the external clock signal frequency is allowed to change.

7. A method according to claim 6, further comprising the steps of:

receiving a completion signal indicating that the external clock signal frequency change has been made; and after a period of time has occurred after said completion signal is detected sufficient to allow said divide by one clock generator to stabilize, switching from operation of said non-one divider type generator to said divide by one generator.

8. A method as recited in claim 6, further comprising the step of switching the microprocessor from operation from said non-one divider type clock generator to operation from said divide by one clock generator after providing said ready signal.

9. A method as recited in claim 8, wherein said step of switching the microprocessor from operation from said non-one divider type clock generator to operation from said divide by one clock generator is provided after a delay period.

10. A method as recited in claim 8, wherein said step of switching the microprocessor from operation from said non-one divider type clock generator to operation from said divide by one clock generator is provided after receiving a signal indicating that the external clock signal frequency has changed.

11. A method as recited in claim 10, said signal being inactivation of said request signal.

\* \* \* \* \*